US009773103B2

(12) United States Patent
Murai et al.

(10) Patent No.: US 9,773,103 B2
(45) Date of Patent: Sep. 26, 2017

(54) OPERATION DEVICE AND OPERATION METHOD

(71) Applicant: KYOCERA Document Solutions Inc., Osaka (JP)

(72) Inventors: Satomi Murai, Osaka (JP); Akihiro Umenaga, Osaka (JP); Rie Kasai, Osaka (JP); Hiroshi Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 113 days.

(21) Appl. No.: 14/817,763

(22) Filed: Aug. 4, 2015

(65) Prior Publication Data

US 2016/0042171 A1 Feb. 11, 2016

(30) Foreign Application Priority Data

Aug. 8, 2014 (JP) ................................. 2014-162070

(51) Int. Cl.
*G06F 21/00* (2013.01)
*G06F 21/36* (2013.01)
*G06F 3/0488* (2013.01)

(52) U.S. Cl.
CPC .......... *G06F 21/36* (2013.01); *G06F 3/04886* (2013.01); *G06F 2221/2125* (2013.01)

(58) Field of Classification Search
CPC ................. G06F 21/36; G06F 3/04886; G06F 2221/2125
(Continued)

(56) References Cited

U.S. PATENT DOCUMENTS

| 8,638,939 B1* | 1/2014 | Casey | G06F 21/36 380/277 |
| 2009/0158190 A1* | 6/2009 | Higginson | G06F 3/0481 715/773 |

(Continued)

FOREIGN PATENT DOCUMENTS

| JP | 2013-016115 A | 1/2013 |
| JP | 2013-196628 A | 9/2013 |

(Continued)

OTHER PUBLICATIONS

An Office Action; "Notification of Reasons for Refusal" issued by the Japanese Patent Office dated Aug. 10, 2016, which corresponds to Japanese Patent Application No. 2014-162070 and is related to U.S. Appl. No. 14/817,763; with English language translation.

*Primary Examiner* — John B King
(74) *Attorney, Agent, or Firm* — Studebaker & Brackett PC (57) ABSTRACT

An operation device includes a screen display section that displays a login screen on a touch panel, a key position changing section, a key information reception section, and a key information determination section. The key position changing section changes positions of a plurality of keys that are displayed on the login screen such that the keys are displayed for a current login process at positions that are different from previous positions at which the keys were displayed for a previous login process. The key information reception section generates input information representing a key pressed on the login screen. The key information determination section allows login of a user when a combination of pieces of input information corresponding to a plurality of key presses performed by the user matches
(Continued)

registration information and does not allow login of the user when the combination does not match registration information.

8 Claims, 9 Drawing Sheets

(58) Field of Classification Search
USPC .......................................................... 726/19
See application file for complete search history.

(56) References Cited

U.S. PATENT DOCUMENTS

| | | | |
|---|---|---|---|
| 2012/0092277 A1* | 4/2012 | Momchilov | G06F 3/038 |
| | | | 345/173 |
| 2012/0151400 A1* | 6/2012 | Hong | G06F 3/04817 |
| | | | 715/769 |
| 2013/0139226 A1* | 5/2013 | Welsch | G06F 21/36 |
| | | | 726/4 |
| 2013/0145448 A1* | 6/2013 | Newell | G06F 21/31 |
| | | | 726/7 |
| 2015/0134526 A1* | 5/2015 | Russell | G06F 21/31 |
| | | | 705/44 |

FOREIGN PATENT DOCUMENTS

| | | |
|---|---|---|
| JP | 2016001426 A | 1/2016 |
| WO | 2013082260 A1 | 6/2013 |

* cited by examiner

OPERATION DEVICE AND OPERATION METHOD

INCORPORATION BY REFERENCE

The present application claims priority under 35 U.S.C. §119 to Japanese Patent Application No. 2014-162070, filed Aug. 8, 2014. The contents of this application are incorporated herein by reference in their entirety.

BACKGROUND

The present disclosure relates to an operation device and an operation method.

In recent years, a lot of techniques have been offered for user authentication in operation devices provided in information processing apparatuses such as printers, copiers, and multifunction peripherals. For example, in an information processing terminal, a user unlocks a locked screen by pattern lock. The pattern lock refers to a system for unlocking a locked screen by matching a trail (lock pattern) made by a user running a finger from point to point among a grid of points displayed on a touch panel with a preregistered pattern. The information processing terminal varies a location or a size of a grid of points that are displayed on a touch panel while a user runs a finger in accordance with a specified lock pattern. Varying the location or the size of the points is expected to reduce risk of the lock pattern being guessed by someone else from fingerprints left on the touch panel in the information processing terminal employing the pattern lock. Another information processing terminal displays candidates of unlocking information that is used for inputting unlocking signals while moving the candidates from location to location on a touch panel. Moving the candidates is expected to prevent, when the information processing terminal is in a function unusable state such as a screen lock state, someone else from easily releasing such a state.

SUMMARY

An operation device according to an aspect of the present disclosure includes a screen display section, a key position changing section, a key information reception section, a key information determination section, and a storage section. The screen display section displays a login screen on a touch panel. The key position changing section changes positions of a plurality of keys that are displayed on the login screen such that the plurality of keys are displayed for a current login process at positions that are different from previous positions at which the plurality of keys were displayed for a previous login process. The key information reception section receives a press of a key on the login screen among the plurality of keys and generate input information representing the key pressed. The key information determination section determines whether or not a combination of pieces of input information corresponding to a plurality of key presses that are performed by a user on the login screen matches registration information preregistered in the storage section, and allow login of the user when the combination of the pieces of input information matches the registration information and does not allow login of the user when the combination of the pieces of input information does not match the registration information.

An operation method according to an aspect of the present disclosure includes: displaying, on a first login screen displayed for a current login process, a plurality of keys at positions that are different from positions at which the plurality of keys were displayed on the first login screen displayed for a previous login process; receiving a press of a key among the plurality of keys and generating input information representing the key pressed; and displaying, on a second login screen displayed for the current login process based on the generated input information, the plurality of keys at positions that are different from positions at which the plurality of keys were displayed on the second login screen displayed for the previous login process.

DETAILED DESCRIPTION

Hereinafter, embodiments of an operation device and an operation method according to the present disclosure will be described with reference to the accompanying drawings to assist with understanding of the present disclosure. The following embodiments are provided as specific examples of the present disclosure and do not in any way limit the technical scope of the present disclosure. The letter "S" appearing before numbers in a flowchart is used as an abbreviation for "step".

Hereinafter, an image forming apparatus including an operation device will be described as an example of the operation device of the embodiment of the present disclosure. The image forming apparatus of the present disclosure is for example a multifunction peripheral (MFP) having functions of a facsimile machine, a copier, a scanner, a printer, and so on.

Figure 1:
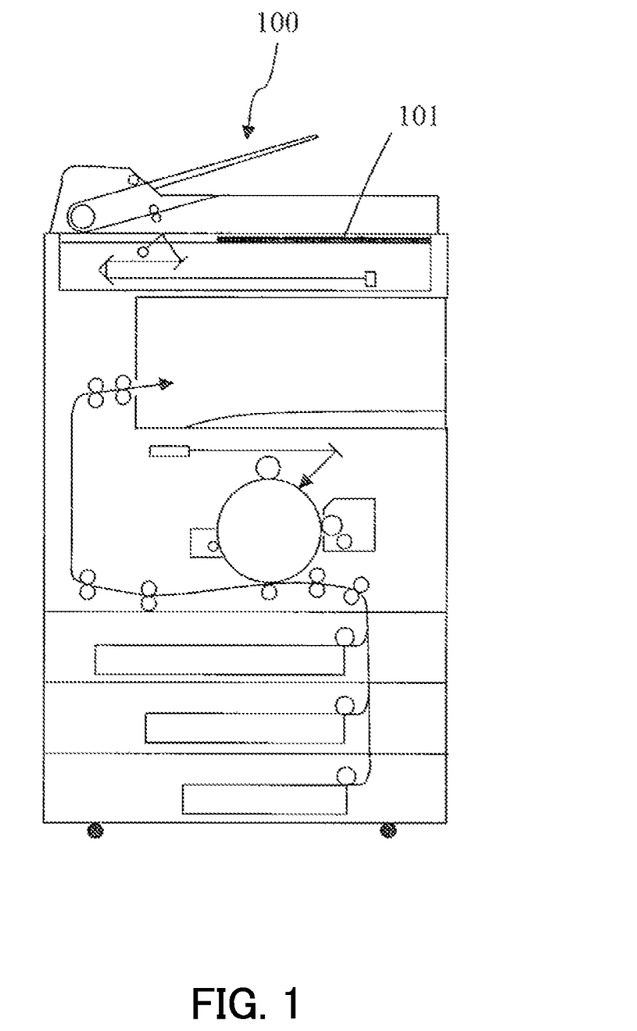
FIG. 1 is a conceptual diagram illustrating configuration of a multifunction peripheral according to an embodiment of the present disclosure.

The multifunction peripheral 100 includes an operation panel 101 as illustrated in FIG. 1. The multifunction peripheral 100 receives settings for a printing job from a user via the operation panel 101. According to the settings, the multifunction peripheral 100 actuates sections thereof such as an image reading section, an image forming section, a conveyance section, and a fixing section to implement the printing job.

Figure 2:
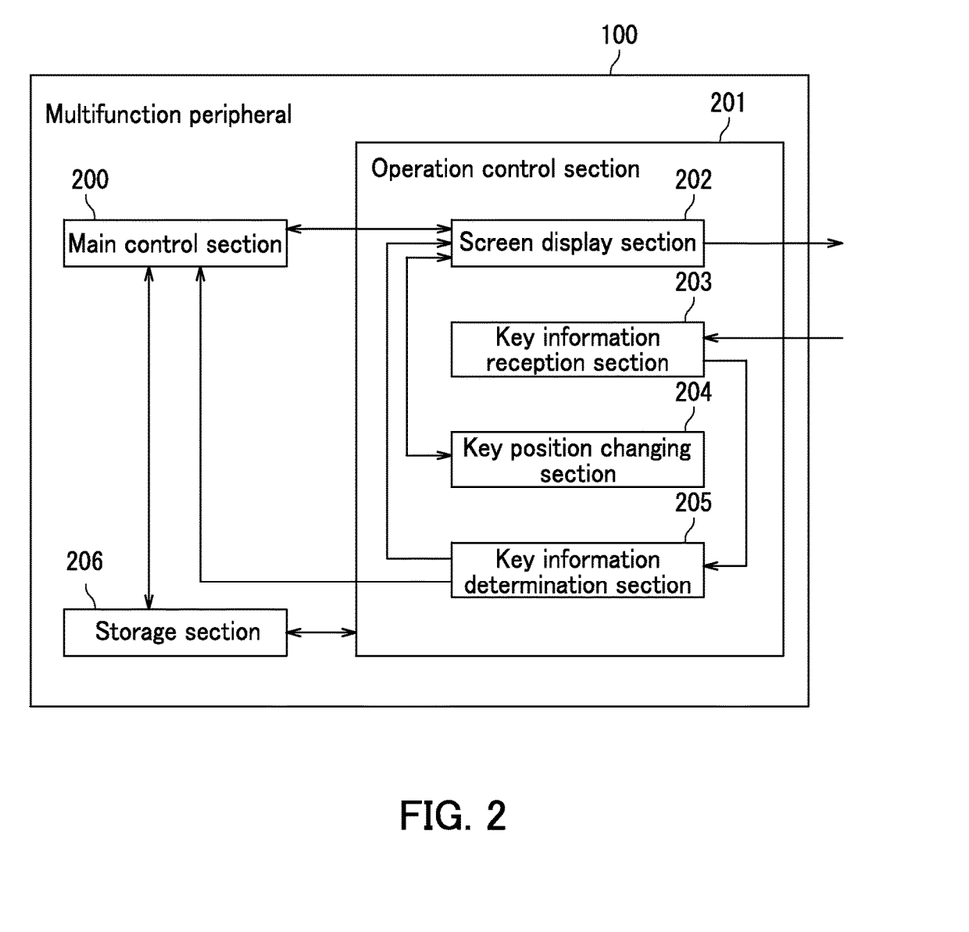
FIG. 2 is a functional block diagram of the multifunction peripheral according to the embodiment of the present disclosure.

Next, configuration and a procedure according to a first embodiment of the present disclosure will be described with reference to FIGS. 2-6B. FIG. 2 is a functional block diagram of the multifunction peripheral 100. As illustrated in FIG. 2, the multifunction peripheral 100 includes a main control section 200, a storage section 206, and an operation control section 201. The operation control section 201 includes a screen display section 202, a key information reception section 203, a key position changing section 204, and a key information determination section 205.

The main control section 200 includes a central processing unit (CPU). The storage section 206 includes read only memory (ROM), random access memory (RAM), and a hard disk drive (HDD). The CPU for example uses the RAM as a work area for executing a program stored, for example, in the ROM or the HDD. Based on an execution result of the program, the CPU performs reception from a driver of data, an instruction, a signal, and a command, and controls operation of each of the drivable sections involved in execution of the printing job.

A program and data for implementing each of the screen display section 202, the key information reception section 203, the key position changing section 204, and the key information determination section 205 are stored in the storage section 206. The screen display section 202, the key information reception section 203, the key position changing section 204, and the key information determination section 205 are implemented through execution of the program by the CPU.

Next, the screen display section 202, the key information reception section 203, the key position changing section 204, and the key information determination section 205 will be described with reference to FIGS. 3-6B.

The present embodiment is described on the assumption that the multifunction peripheral 100 has shifted from an image formation state into a power-saving sleep state after a predetermined sleep time. Once a user touches a touch panel 102 in the operation panel 101 (see FIG. 4A), the main control section 200 releases the sleep state and supplies electric power to each section. Supplied with electric power, the screen display section 202 displays a login screen for user authentication on the touch panel 102 (S101 in FIG. 3), thereby preventing use of functions and access to personal data through impersonation. In the present embodiment, the screen display section 202 displays a plurality of login screens varied in keys that are displayed thereon for one login process. The keys that are displayed on the login screen are varied in response to the user pressing a key among the keys displayed on the login screen.

Figure 4A:
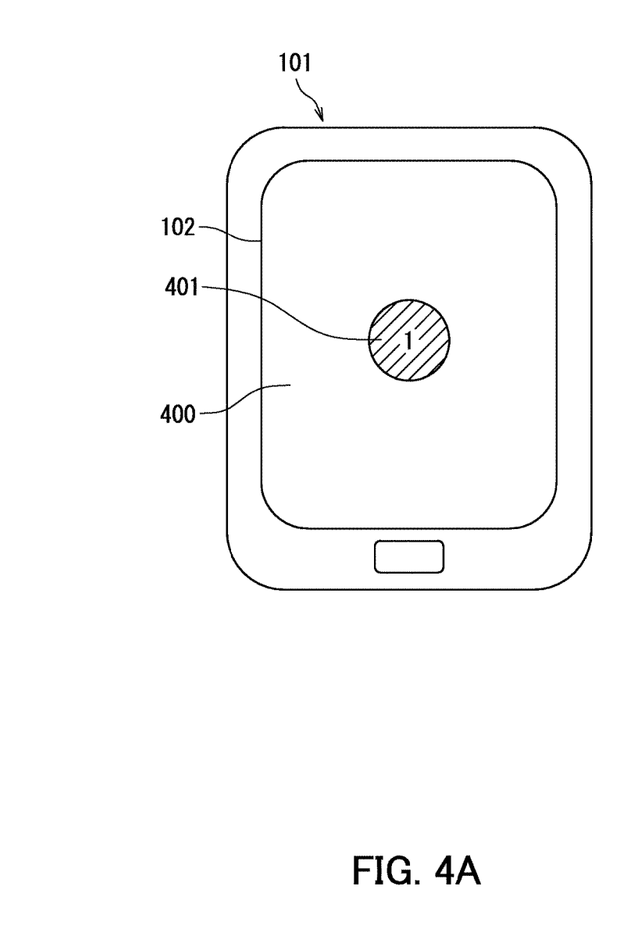
FIG. 4A is a diagram illustrating an example of a first login screen in the first embodiment of the present disclosure.
Figure 4B:
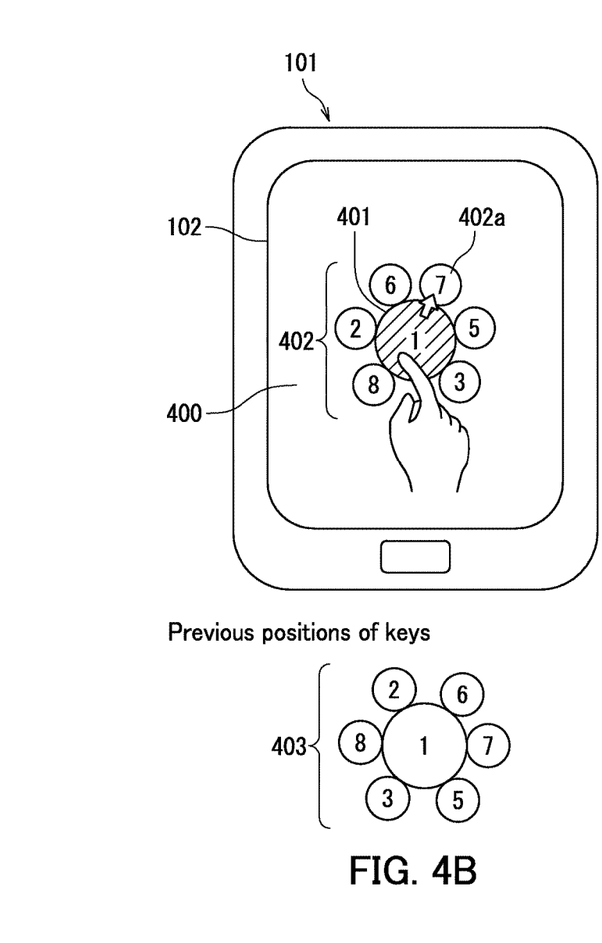
FIG. 4B is a diagram illustrating an example of a second login screen in the first embodiment of the present disclosure.

More specifically, the touch panel 102 in the operation panel 101 displays a login screen 400 as illustrated in FIG. 4A. The login screen 400 displays a key (e.g., "1" key) for inputting password information. In the present embodiment, the key has a circular shape. Once the user presses (selects) the "1" key 401 as illustrated in FIG. 4B, the key information reception section 203 receives the press of the "1" key 401. The key information reception section 203 creates input information ("1") representing the "1" key 401 and stores the information in the storage section 206 to temporarily hold the information. The key information reception section 203 also notifies the key position changing section 204 of reception of the press of the "1" key 401.

Figure 3:
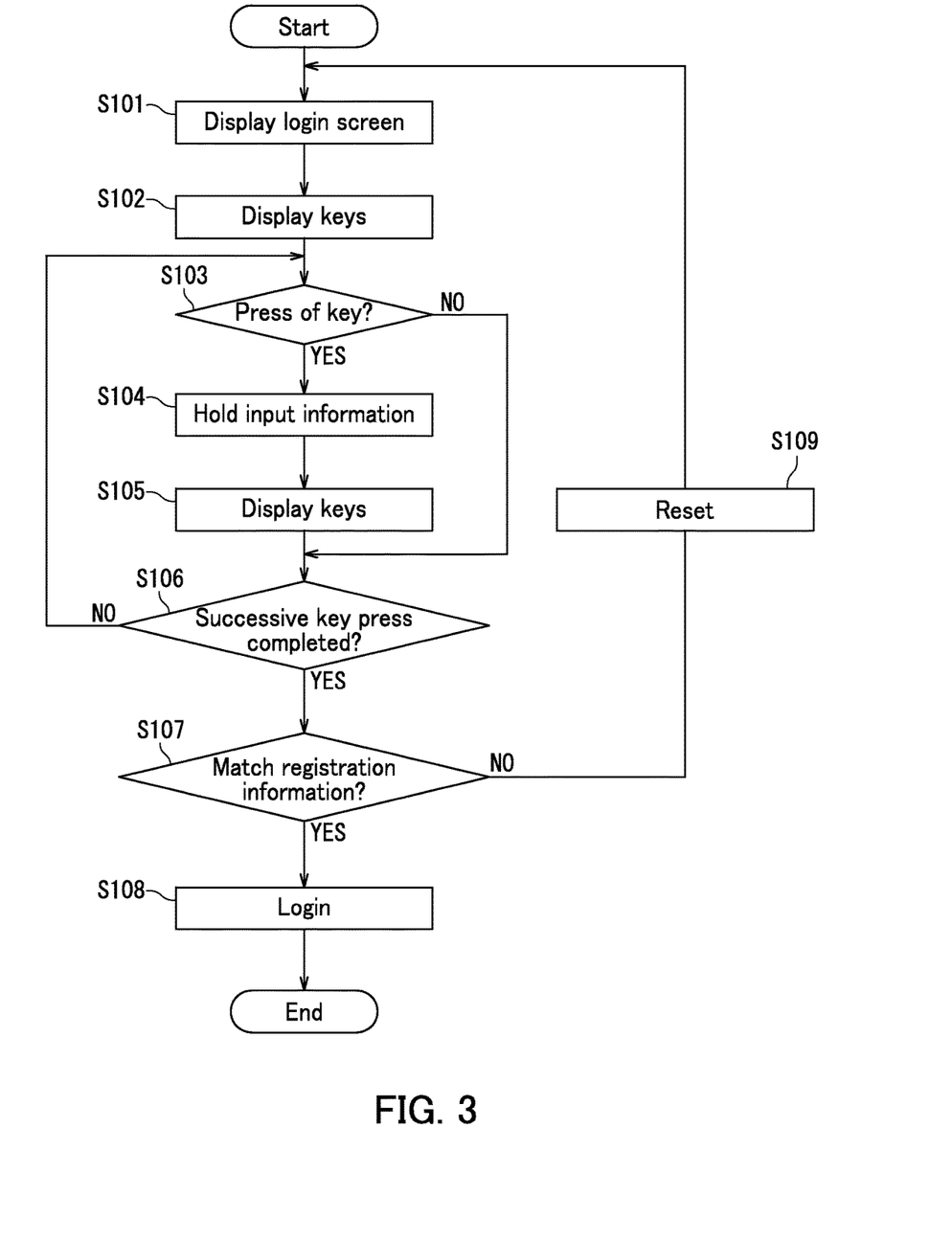
FIG. 3 is a flowchart showing a procedure for performing a first embodiment of the present disclosure.

Upon receiving the notification from the key information reception section 203, the key position changing section 204 displays a plurality of keys on the login screen 400 at positions 402 that are different from previous positions 403 (S102 in FIG. 3). The previous positions 403 refer to positions at which the plurality of keys were displayed for a previous login process performed before the current login process.

It should be noted here that no particular limitation is placed on the method by which the key position changing section 204 changes the positions of the respective keys. For example, the key position changing section 204 stores in the storage section 206 the positions of the respective keys displayed on the login screen 400 when the login screen 400 finishes displaying the keys. The key position changing section 204 then refers to the positions of the respective keys stored in the storage section 206 when the screen display section 202 displays the login screen 400 on the touch panel 102 for the next login process. That is, the key position changing section 204 refers to the positions of the respective keys displayed for the previous login process and stored in the storage section 206 as the previous positions. The key position changing section 204 then changes the positions of the keys to be displayed on the login screen 400 into positions that are different from the previous positions. For example, as illustrated in FIG. 4B, the keys are presented in order of a "6" key, a "7" key, a "5" key, a "3" key, a "8" key, and a "2 key" in the previous positions 403, starting at an upper right location relative to the "1" key 401 in a clockwise order. In this case, the key position changing section 204 changes the position of the "6" key to the last sequential position so that the keys are presented in order of the "7" key, the "5" key, the "3" key, the "8" key, the "2" key, and the "6" key in the current positions 402, starting at the upper right location relative to the "1" key 401 in the clockwise order. In the present embodiment, each of the keys has a circular shape.

No particular limitation is placed on the way to change the order. For example, the order may be changed randomly using random numbers every time the login screen 400 is displayed. No particular limitation is placed on the type of the keys to be displayed. For example, keys other than candidate keys for password entry may be selected randomly. As described above, locations where the user's fingerprints are left can be changed every time password entry is started.

In the example shown in FIG. 4B, the key position changing section 204 displays a plurality of keys (an example of the second keys) as candidate keys that are each suited to be pressed next by arranging the keys in a radial fashion (in an encircling fashion) around the "1" key 401 (an example of the first key) being pressed. Thus, the keys displayed as candidate keys that are each suited to be pressed next are adjacent to the "1" key being pressed. This arrangement enables the user to successively press keys with less range of motion of a hand and fingers. The positions 402 of the respective keys may be random each time. The number of the keys is not particularly limited as long as at least two keys are displayed. The number may be constant or may increase or decrease each time.

Figure 5A:
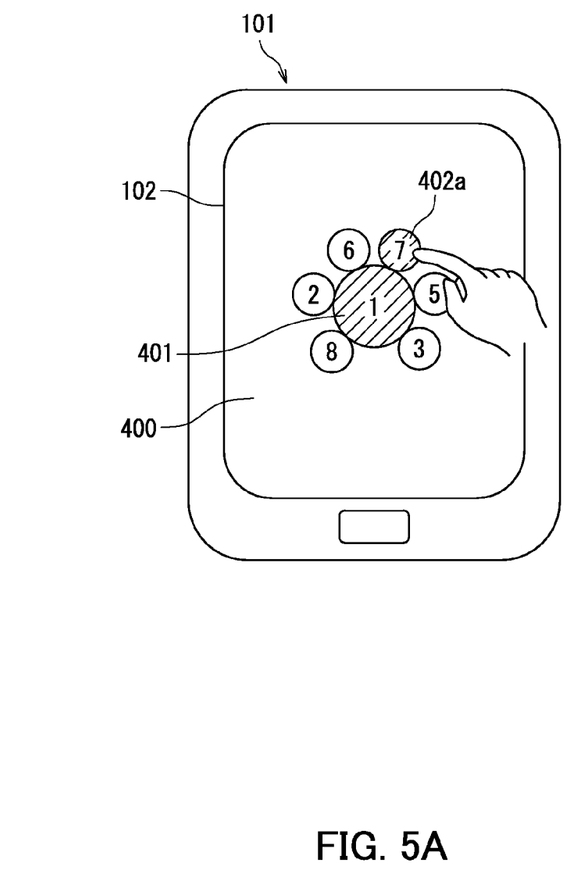
FIG. 5A is a diagram illustrating an example of a third login screen in the first embodiment of the present disclosure.

When the user presses the "7" key 402a after pressing the "1" key 401 as illustrated in FIG. 4B, the key information reception section 203 receives the press of the "7" key 402a (YES in S103 in FIG. 3). As illustrated in FIG. 5A, the key information reception section 203 also changes a background color (white) in the "7" key 402a to another background color (blue) indicating that the key is being pressed. The key information reception section 203 then temporarily stores and holds input information ("7") of the "7" key 402a in the storage section 206 (S104 in FIG. 3). The key information reception section 203 then notifies the key position changing section 204 of reception of the input of the number "7" key 402a. Upon receiving the notification from the key information reception section 203, the key position changing section 204 displays a plurality of keys as candidate keys that are each suited to be pressed next at positions around the "1" key 401 being pressed that are different from the previous positions of the respective keys (S105 in FIG. 3).

Figure 5B:
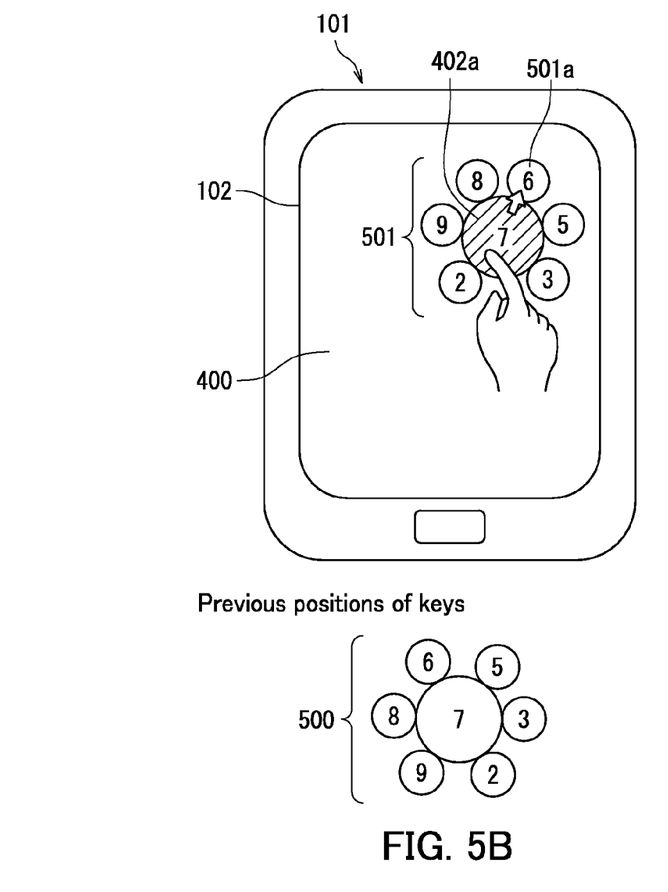
FIG. 5B is a diagram illustrating an example of a fourth login screen in the first embodiment of the present disclosure.

It should be noted here that no particular limitation is placed on the method by which the key position changing section 204 changes the positions of the respective keys. For example, in response to the "7" key being pressed, the key position changing section 204 refers to the previous positions of a plurality of keys displayed near the "7" key that are stored in the storage section 206 in the example shown in FIG. 5A. The key position changing section 204 then displays on the login screen 400 the plurality of keys at positions 501 that are different from previous positions 500. More specifically, as illustrated in FIG. 5B, the keys are presented in order of the "5" key, the "3" key, the "2" key, the "9" key, the "8" key, and the "6 key" in the previous positions 500, starting at an upper right location relative to the "7" key 402a in a clockwise order. In this case, the key position changing section 204 changes the position of the "5" key to the last sequential position so that the keys are presented as the "3" key, the "2" key, the "9" key, the "8" key, the "6" key, and the "5" key in the current positions 501, starting at the upper right location relative to the "7" key 402a in a clockwise order.

The key position changing section 204 enlarges a diameter (size) of the "7" key 402a being pressed to the same diameter (size) as the "1" key 401. The key position changing section 204 then displays the plurality of keys at the positions that are different from the previous positions in a radial fashion around the position of the "7" key 402a having an enlarged diameter. The type of the keys to be displayed next is not particularly limited and may be for example the same as the type of the keys previously displayed. According to the configuration, keys that have been displayed once can be displayed again and input information (number) that has been input once can be input again. Therefore, the same input information (number) can be used any number of times, allowing formation of a large number of different input information combinations.

The key information reception section 203 determines whether or not the user has finished the successive key press (S106 in FIG. 3). No limitation is placed on the method by which the key information reception section 203 determines completion of the successive key press. For example, the key information reception section 203 determines whether or not the keys are being successively pressed based on whether or not the user's hand (touch) is pulled away from the touch panel 102 within a predetermined period of time.

Figure 6A:
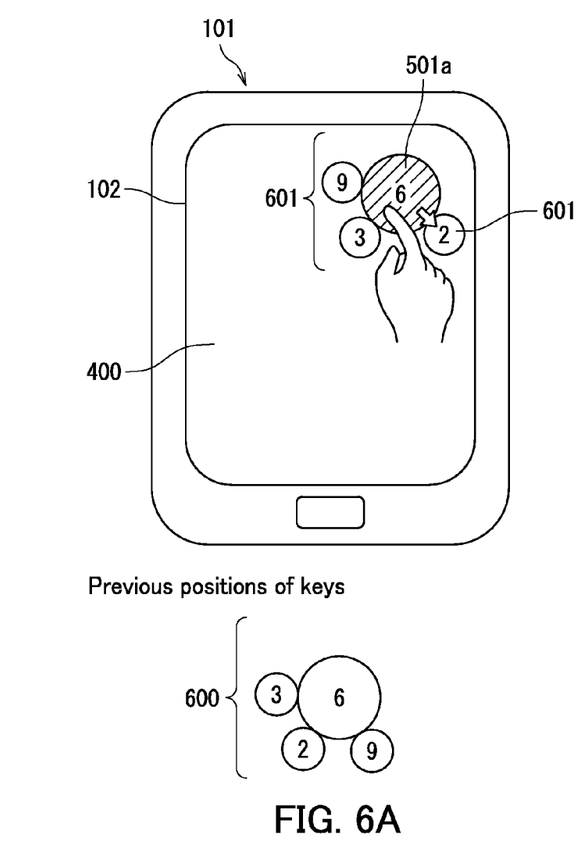
FIG. 6A is a diagram illustrating an example of a fifth login screen in the first embodiment of the present disclosure.

When the key information reception section 203 determines that the successive key press has not been completed, that is, when the user is still in the middle of the successive key press without stopping the touch on the touch panel 102 (NO in S106 in FIG. 3), the procedure returns to S103. The key information reception section 203 then receives the user's press of another key (S103 in FIG. 3). For example, when the user presses the "6" key 501a displayed as a candidate key as illustrated in FIG. 5B, the key information reception section 203 receives the press of the "6" key 501a (YES in S103 in FIG. 3) and changes the background color in the "6" key 501a from white to blue as illustrated in FIG. 6A. The key information reception section 203 then temporarily holds input information ("6") of the "6" key 501a in the storage section 206 (S104 in FIG. 3). The key position changing section 204 then displays a plurality of keys as candidate keys that are each suited to be pressed next at positions 601 that are different from previous positions 600 (S105 in FIG. 3). The respective keys are displayed at the positions in the same manner as described above.

Figure 6B:
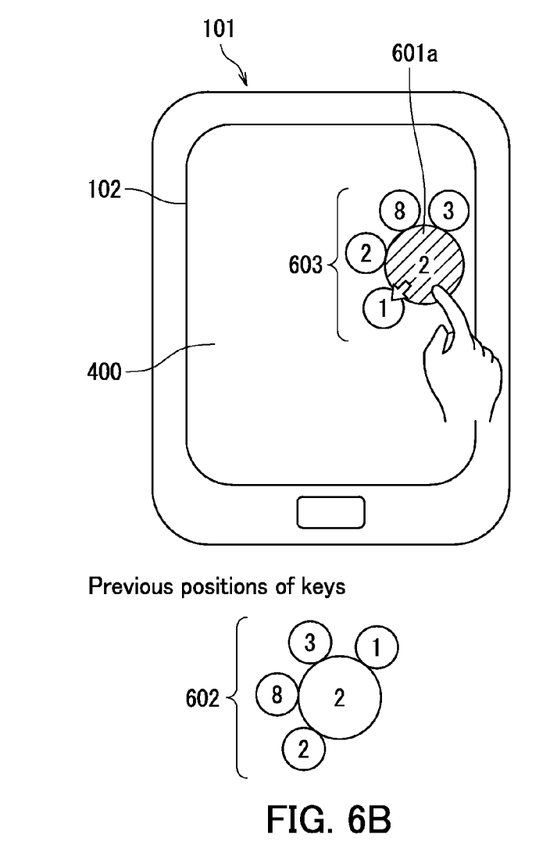
FIG. 6B is a diagram illustrating an example of a sixth login screen in the first embodiment of the present disclosure.

When the "2" key 601a among the newly displayed keys is pressed by the user, that is, when the successive key press is not completed yet (NO in S106 in FIG. 3), the key information reception section 203 receives the press of the "2" key 601a (YES in S103 in FIG. 3), changes the background color in the "2" key 601a being pressed from white to blue as illustrated in FIG. 6B, and temporarily stores and holds input information ("2") of the "2" key 601a in the storage section 206 (S104 in FIG. 3). The key position changing section 204 then displays a plurality of keys as candidate keys that are each suited to be pressed next at the positions 603 that are different from previous positions 602 (S105 in FIG. 3). Since the positions of the plurality of keys are changed every time the plurality of keys are displayed as described above, locations where the user's fingerprints are left can be changed accordingly within the login screen. That is, the user's finger makes a different trail in each entry of a series of keys on the login screen. Accordingly, a plurality of trails of fingerprints are left on the touch panel 102. It is therefore possible to reduce the risk of the input information (combination) being guessed by someone else from the fingerprints left on the touch panel 102. Furthermore, since the user can enter their password with less range of motion of a fingertip, operating burden on the user is less.

On the other hand, when the user stops pressing a key after pressing the "1" key (pulls their own hand away from the touch panel 102), the key information reception section 203 determines that the successive key press has been completed (YES in S106 in FIG. 3). In a situation in which the user does not press any key after a predetermined period of time from display of the keys (NO in S103 in FIG. 3), the procedure proceeds to S106.

Upon determining completion of the successive press of the plurality of keys, the key information reception section 203 notifies the key information determination section 205 accordingly. Upon receiving the notification from the key information reception section 203, the key information determination section 205 determines whether or not a combination of pieces of input information that are in one-to-one correspondence with the plurality of keys received through the successive key press matches registration information preregistered in the storage section 206 (S107 in FIG. 3).

No particular limitation is placed on the method of the determination process by the key information determination section 205. For example, the key information determination section 205 retrieves the pieces of input information temporarily held in the storage section 206 in the stored order and determines whether or not the combination of the retrieved pieces of input information ("1", "7", "6", "2", and then "1") matches the registration information.

Upon determining that the combination of the pieces of input information matches the registration information (YES in S107 in FIG. 3), the key information determination section 205 determines that the user who has entered the combination is a registered user (allows login) and notifies the screen display section 202 and the main control section 200 accordingly. This completes the user authentication (login) (S108 in FIG. 3). Upon receiving the notification, the screen display section 202 displays on the touch panel 102 an operation screen relating to operation of the multifunction peripheral 100. Meanwhile, upon receiving the notification, the main control section 200 becomes ready for image formation.

Upon determining that the combination of the pieces of input information does not match the registration information in S107 (NO in S107 in FIG. 3), on the other hand, the key information determination section 205 determines that the user who has entered the combination is not a registered user (does not allow login). The key information reception section 203 deletes (resets) the input information temporarily held in the storage section 206 (S109 in FIG. 3). Thereafter, the screen display section 202 displays on the touch panel 102 a login screen to be used for a next login process (S101 in FIG. 3).

Next, configuration and a procedure according to a second embodiment of the present disclosure will be described with reference to FIGS. 2 and 7-9B. The configuration according to the second embodiment of the present disclosure is different from the configuration according to the first embodiment of the present disclosure mainly in that positions of keys that are displayed on the login screen are not changed in response to a key press by a user.

Figure 7:
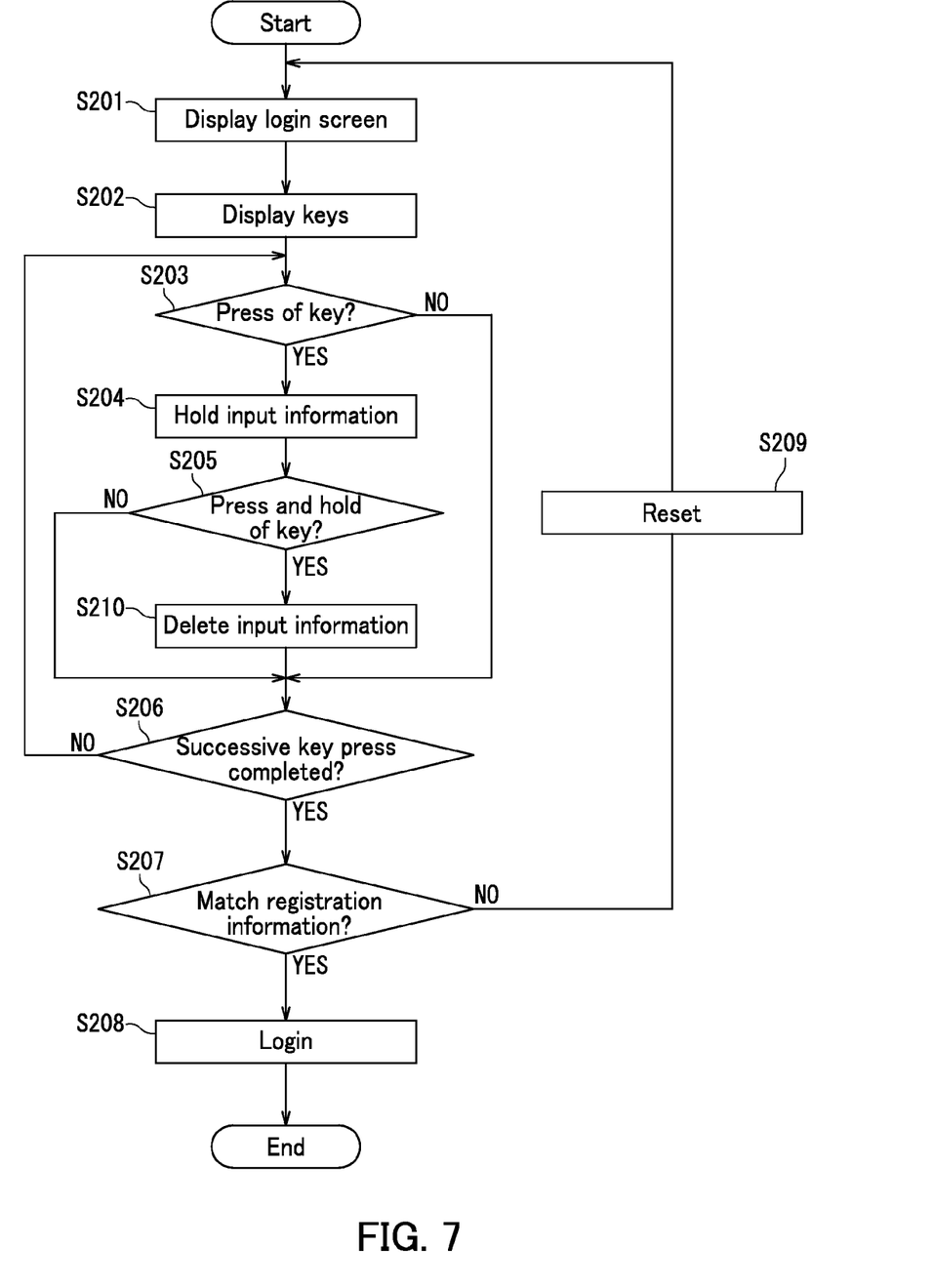
FIG. 7 is a flowchart showing a procedure for performing a second embodiment of the present disclosure.

Once a user touches the touch panel 102 in the operation panel 101, the screen display section 202 displays a login screen on the touch panel 102 (S201 in FIG. 7).

In doing so, the screen display section 202 notifies the key position changing section 204 of display of the login screen. Upon receiving the notification from the screen display section 202, the key position changing section 204 displays on the login screen a plurality of keys at positions that are different from previous positions as in the first embodiment (S202 in FIG. 7).

Figure 8A:
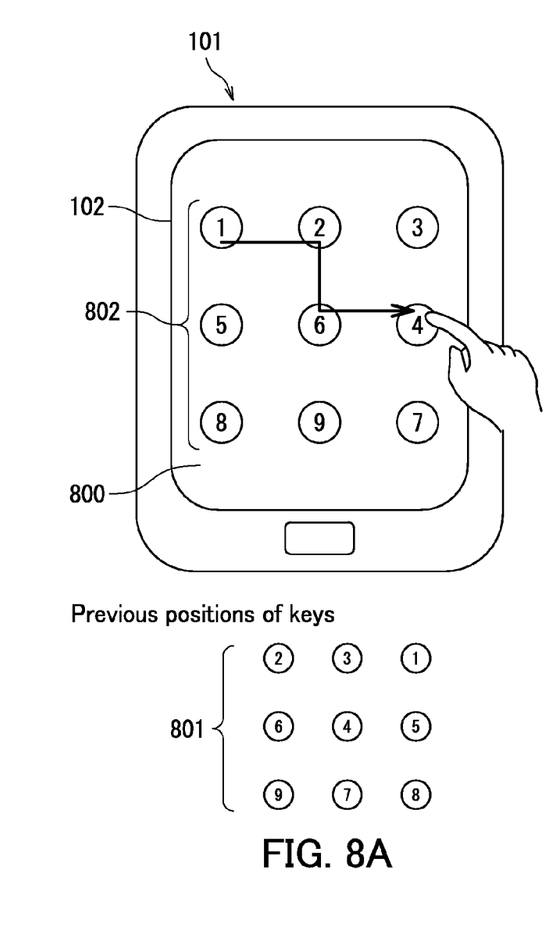
FIG. 8A is a diagram illustrating an example of a first login screen in the second embodiment of the present disclosure.

For example, as illustrated in FIG. 8A, previous positions 801 of the keys on a login screen 800 are stored in the storage section 206. As the previous positions 801, the "2" key, the "3" key, and the "1" key are stored in an upper line, the "6" key, the "4" key, and the "5" key are stored in a middle line, and the "9" key, the "7" key, and the "8" key are stored in a lower line. Referring to the storage section 206, the key position changing section 204 changes the order of the keys such that the key at the last sequential position in each line is at the first sequential position in each line. More specifically, the key position changing section 204 changes the order of the keys so that: the positions of the keys in the upper line are in order of the "1" key, the "2" key, and the "3" key; the positions of the keys in the middle line are in order of the "5" key, the "6" key, and the "4" key; and the positions of the keys in the lower line are in order of the "8" key, the "9" key, and the "7" key. The key position changing section 204 then displays the thus arranged keys on the login screen 800 to display the keys at positions 802 that are different from the previous positions 801. In this way, positions at which a plurality of keys are displayed are changed every time the login screen 800 is displayed (for every login process).

When the user presses the "1" key on the login screen 800, the key information reception section 203 receives the press of the "1" key (YES in S203 in FIG. 7) and temporarily stores and holds input information ("1") of the "1" key in the storage section 206 (S204 in FIG. 7).

Furthermore, the key information reception section 203 determines whether or not the press of the "1" key is a press and hold (S205 in FIG. 7). It should be noted here that no particular limitation is placed on the method by which the key information reception section 203 determines whether or not the press is a press and hold. For example, the key information reception section 203 determines whether or not a predetermined press and hold time (e.g., two seconds) has elapsed since the reception of the press of the "1" key while the key is kept pressed. In the case where the predetermined press and hold time has elapsed since the reception of the press of the "1" key while the key is kept pressed, the key information reception section 203 determines that the press of the "1" key is a press and hold. The case where the key information reception section 203 determines that the press is a press and hold will be described later.

In the case where the key information reception section 203 determines that the press of the "1" key is not a press and hold in S205 (NO in S205 in FIG. 7), the key information reception section 203 subsequently determines whether or not the successive key press has been completed (S206 in FIG. 7).

Upon the key information reception section 203 determining that the successive key press has not been completed yet (NO in S206 in FIG. 7), the procedure returns to S203. In S203, the key information reception section 203 receives the user's press of another key. For example, when the user presses the "1" key, the "2" key, the "6" key, and the "4" key successively as illustrated in FIG. 8A, the key information reception section 203 receives the presses of these keys (YES in S203 in FIG. 7) and temporarily stores and holds pieces of input information of the keys ("1", "2", "6", and "4") in the storage section 206 (S204 in FIG. 7). Once the user stops touching the touch panel 102 at the "4" key, the key information reception section 203 determines that the successive key press has been completed (YES in S206 in FIG. 7). The key information determination section 205 then determines whether or not a combination of the pieces of input information of the plurality of keys received through the successive key press matches registration information (S207 in FIG. 7).

Upon the key information determination section 205 determining that the combination of the pieces of input information matches the registration information (YES in S207 in FIG. 7), the key information determination section 205 completes the user authentication (login) (S208 in FIG. 7). Upon determining that the combination of the pieces of input information does not match the registration information in S207 (NO in S207 in FIG. 7), on the other hand, the key information determination section 205 deletes (resets) the input information temporarily stored by the key information reception section 203 in the storage section 206 (S209 in FIG. 7). Thereafter, the screen display section 202 displays a login screen on the touch panel 102 (S201 in FIG. 7).

Figure 8B:
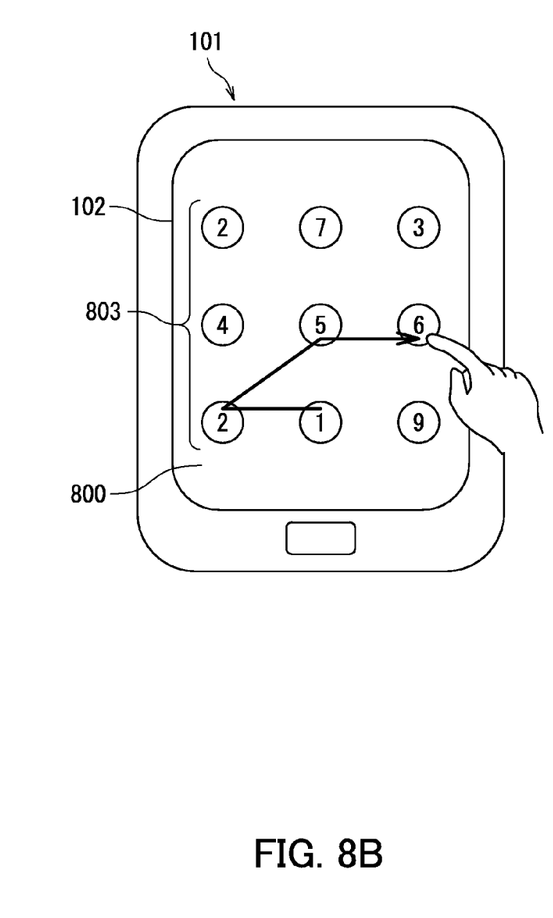
FIG. 8B is a diagram illustrating an example of a second login screen in the second embodiment of the present disclosure.

In a situation in which the user logs out using the operation panel 101, and thereafter logs in again using the operation panel 101, the key position changing section 204 displays on the login screen 800 a plurality of keys at positions 803 that are different from the previous positions 802 (S202 in FIG. 7) as illustrated in FIG. 8B. That is, the positions at which the plurality of keys are displayed are changed every time a login process is performed. Thus, locations where the user's fingerprints are left are changed even if the user successively presses the same key multiple times. Accordingly, the security can be improved.

Figure 9A:
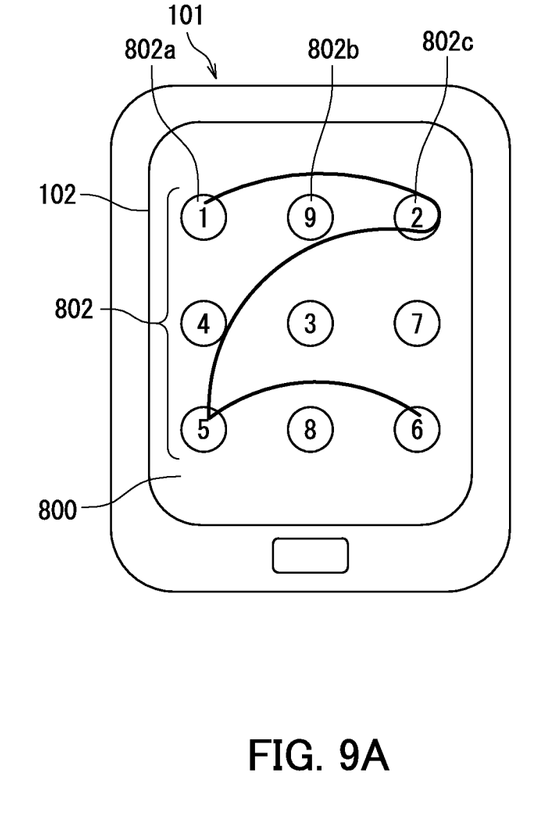
FIG. 9A is a diagram illustrating an example of a third login screen in the second embodiment of the present disclosure.

In a situation in which a user presses a desired key 802a (e.g., "1" key) with a finger among the keys at the positions 802 on the login screen 800 as illustrated in FIG. 9A, and then runs the finger along a course outside (around) another key 802b (e.g., "9" key) to press another desired key 802c (e.g., "2" key), for example, the key information reception section 203 does not receive input information of the key around which the finger has been run. Accordingly, the user does not need to pull the finger away from the touch panel 102 every time the user presses a key. As a result, the key operating burden on the user can be reduced.

Figure 9B:
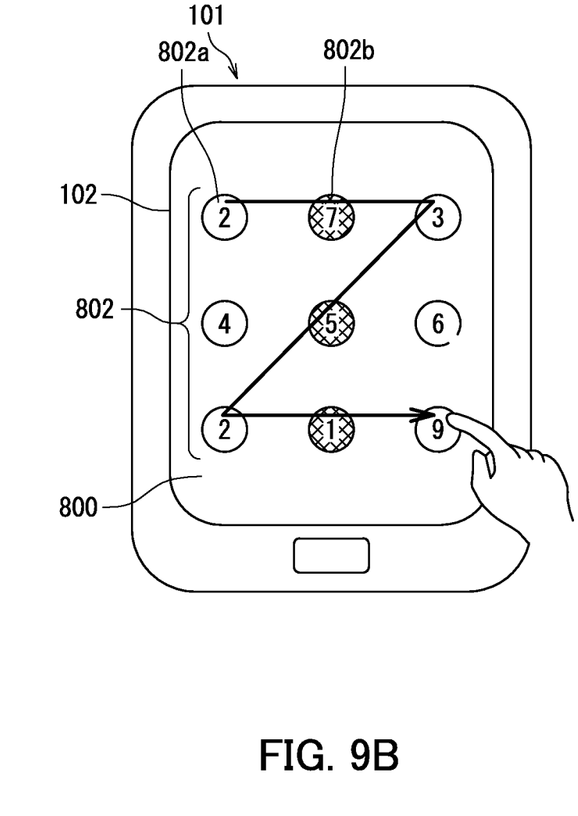
FIG. 9B is a diagram illustrating an example of a fourth login screen in the second embodiment of the present disclosure.

The user may press an undesired key 802b (e.g., "9" key) after pressing a desired key 802a (e.g., "1" key) in S203 in FIG. 7 as illustrated in FIG. 9B. Then, the key information reception section 203 receives the press of the "9" key 802b (YES in S203 in FIG. 7) and temporarily stores and holds input information of the "9" key 802b in the storage section 206 (S204 in FIG. 7). In this case, the user can delete the input information temporarily stored in the storage section 206 through a press and hold of the key 802b. More specifically, the key information reception section 203 determines that the press of the "9" key 802b is a press and hold when the user presses and holds the key 802b (YES in S205 in FIG. 7). The key information reception section 203 then deletes the input information ("9") of the pressed and held key 802b that is temporarily stored and held in the storage section 206 (S210 in FIG. 7). Thus, the user can perform the entry operation without needing to avoid pressing a key 802b that is not a desired key 802a in the successive key press. In other words, the user can cancel the input information of the undesired key 802b through a press and hold of the key 802b. Consequently, the user does not need to pull the finger away from the touch panel 102 every time the user finishes pressing a key.

The present disclosure has been described for the case where the input information of each key is a number. However, the input information may be any other type of information such as a letter of the alphabet. The present disclosure has been described for the operation panel 101 of the multifunction peripheral 100. However, the present disclosure produces the same effect when applied to an electronic device having a touch panel such as a portable terminal and another type of terminal.

In the embodiments of the present disclosure, each section of the operation control section 201 is implemented through the CPU executing a program stored in the storage section 206. However, the present disclosure is not limited to the embodiments. For example, in a configuration, a storage medium in which a program for implementing such sections is stored may be provided as the present disclosure. According to the configuration, a production apparatus retrieves the program to implement the sections. In this case, the program itself retrieved from the storage medium produces the effect of the present disclosure. Furthermore, a method of storing, in a HDD, steps that are performed by the sections may be provided as the present disclosure.

What is claimed is:

1. An operation device comprising:
a touch panel configured to display, in order, a plurality of login screens each including a plurality of keys each having a circular shape, the plurality of keys including a first key and a plurality of second keys, the plurality of second keys being candidate keys configured to be pressed by a user, the plurality of second keys being independent from one another, the plurality of second keys being arranged such that each second key is in contact with the first key at a periphery thereof and each second key is smaller than the first key;
a processor configured to repeat following sequential operations:
receive a press of any of the plurality of second keys on a login screen, which is one of the plurality of login screens,
generate input information representing the pressed second key, and
cause the touch panel to display a next login screen, which is one of the plurality of login screens, including the pressed second key as the first key; and
a storage section configured to preregister therein registration information of the user and store therein the input information, wherein
the processor changes positions of the plurality of keys that are displayed on a login screen, which is one of the plurality of login screens, such that the plurality of keys are displayed for a current login process at positions that are different from previous positions at which the plurality of keys were displayed for a previous login process,
the processor determines whether or not a combination of pieces of the input information-representing second keys that are pressed by the user on the respective login screens matches the registration information preregistered in the storage section, and allows login of the user when the combination of the pieces of the input information matches the registration information and does not allow login of the user when the combination of the pieces of the input information does not match the registration information, and
the sequential operations are repeated until the combination of pieces of the input information-representing second keys that are pressed by the user on the respective login screens matches the registration information preregistered in the storage section.

2. The operation device according to claim 1, wherein the second keys are arranged around the first key in a radial fashion using the first key as a center.

3. The operation device according to claim 1, wherein a background color in each of the second keys changes in response to a press thereof.

4. The operation device according to claim 1, wherein the processor changes the positions of the plurality of keys randomly.

5. The operation device according to claim 1, wherein in response to a press of a key among the plurality of keys, the processor:
temporarily holds input information representing the key pressed;
determines whether or not the press of the key is a press and hold; and
when the press of the key is a press and hold, deletes the input information representing the key pressed and held.

6. The operation device according to claim 1, wherein the number of the second keys increases or decreases each time the second keys are displayed on any of the login screens.

7. An operation method comprising the steps of:
[a] pre-registering registration information;
[b] displaying, on a first login screen displayed for a current login process, a plurality of keys at positions that are different from positions at which the plurality of keys were displayed on the first login screen displayed for a previous login process;
[c] receiving a press of a key among the plurality of keys and generating input information representing the key pressed; and
[d] displaying, on a second login screen displayed for the current login process based on the generated input information, the plurality of keys at positions that are different from positions at which the plurality of keys were displayed on the second login screen displayed for the previous login process,
wherein
the plurality of keys each have a circular shape,
the plurality of keys include a first key and a plurality of second keys,
the plurality of second keys are candidate keys configured to be pressed by a user,
the plurality of second keys are independent from one another,
the plurality of second keys are arranged such that each second key is in contact with the first key at a periphery thereof,
the first key is larger than each of the plurality of second keys, and
the first key included in the second login screen is a second key pressed among the plurality of second keys included in the first login screen, and
[e] determining whether or not a combination of pieces of the input information representing second keys that are pressed by the user on the respective login screens matches the registration information preregistered, and allows login of the user when the combination of the pieces of the input information matches the registration information and does not allow login of the user when the combination of the pieces of the input information does not match the registration information, and
the aforementioned steps [b] through [d] are repeated until the combination of pieces of the input information-representing second keys that are pressed by the user on the respective login screens matches the registration information preregistered in the storage section.

8. The operation method according to claim 7, wherein
the number of the second keys that are displayed is different between the first login screen and the second login screen.

\* \* \* \* \*